3,153,134
ARC WELDING METHOD BY AN ARC COVERING AGENT COMPOSED MAINLY OF CARBON AND SILICON CARBIDE
Harujiro Sekiguchi, 32 1-chome, Uchikatamachi, Mizuho-ku, Nagoya, Aichi Prefecture, Japan, and Isao Sugioka, Ohgaki, Gifu Prefecture, Japan, assignors of one-half to Harujiro Sekiguchi and one-half to Yawata Iron & Steel Co., Ltd., Tokyo, Japan
Filed Nov. 1, 1961, Ser. No. 149,295
Claims priority, application Japan, Nov. 15, 1960, 35/45,719
5 Claims. (Cl. 219—137)

This invention relates to an arc welding method in which is used an arc covering agent. More particularly it relates to an arc welding method characterized by the use of an arc covering agent composed mainly of carbon and silicon carbide in welding and depositing cast iron.

The present invention relates to an arc welding method characterized in that cast iron can be deposited on a cast iron base material or a steel base material or cast iron parts can be welded by generating an electric arc between said base material and the tip of a steel wire to be fed by using fine particle mixture as an arc covering agent which particle mixture is composed mainly of carbon and silicon carbide with the addition thereto of such flux as lime, fluorite, various oxides or the like and a binding agent such as sodium silicate, potassium silicate, or the like and, as required, of metallic powder or particles.

An object of the present invention is to provide an arc welding method by using an arc covering agent whereby parts of cast iron weld metal low in hardness and free from cracks and blow holes are made, welding can be carried much more efficiently than by an arc welding method which uses a conventional coated welding rod, cast iron weld metal can be efficiently deposited on a cast iron base material or a steel base material, or a cast iron weld metal of any desired hardness can be efficiently deposited on a cast iron base material or a steel base material.

Another object of the present invention is to provide an arc welding method whereby automatic welding, semi-automatic welding and manual welding can be performed easily for welding and depositing cast iron by using a conventional apparatus or machine and an ordinary steel wire for welding steel or a silicon-containing steel wire without the need for special welding rods specific for cast iron or, cast iron can be welded and deposited by using an arc covering agent which can be manufactured and acquired cheaply, simply and easily.

There has been an electric welding system extensively known under the name of the Unionmelt method: submerged Arc Welding Process (U.S. Patent No. 2,043,960 "Electric Welding System" by Union Carbide Company). According to the description in the specification of said U.S. patent said system is "an electric welding system characterized in that a material of a high electric resistance whose electric conductivity will increase with the rise of the temperature is used, this material is a powder and will melt near the tip of an electrode and a part of the current will flow through this melt and wherein the end part of the metallic electrode wire is in contact with a substance deposited on the base material to be welded, the tip of the electrode will be melted by the current flowing between said end part and the base material to be welded and, the weld metal will be thereby deposited on the base material to be welded." Further according to the description in the specification of said U.S. Patent No. 2,043,960, said method is chiefly for welding steel materials and no example of depositing a cast iron weld metal is mentioned therein.

On the other hand, the arc welding method using an arc covering agent according to the present invention relates to welding and depositing cast iron. In the method of the present invention there is used a fine particle mixture of an arc covering agent composed mainly of carbon and silicon carbide with the addition thereto of such flux as lime, fluorite, various oxides or the like and a binder such as sodium silicate, potassium silicate or the like. This carbon is different from the powder material used in the method of said U.S. Patent No. 2,043,960, is low in electric resistance even at the room temperature, is never a high electric resistance material but is generally known as an electrically conductive material. The silicon carbide is also low in electric resistance at the room temperature. Further, at high temperatures above about 1,000° C., the electric conductivity of said material falls with the rise of the temperature.

The carbon used in the method of the present invention is different from the powder material used in the method of said U.S. Patent No. 2,043,960 and is not melted but only burns when exposed to the high temperature of the arc. Thus the method of the present invention is a new welding and depositing method starting from an idea entirely different from that of the electric welding system of said U.S. patent.

As described above, in the present invention, an arc covering agent composed mainly of substances entirely different in nature from those in the case of the Unionmelt method of said U.S. Patent No. 2,043,960 is used and, the ordinary steel wire for welding of steel or silicon containing steel wire is used as a welding rod to joint-weld cast iron base materials or to deposit-weld cast iron on cast iron base materials or steel base materials with favorable results. Thus the method of the present invention has been established.

The accompanying figures shall be briefly explained.

Figure 1:
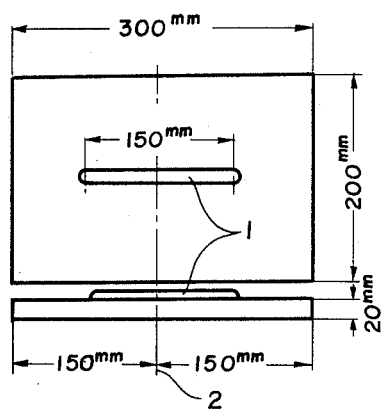
FIGURE 1 shows the dimensions of the cast iron plates and steel plates to be welded and the position of the deposited single bead in Examples 1 to 6 (Table 1) of experiments by the method of present invention.

As also shown in the examples of Table 1, the arc covering agent in the present invention is composed mainly of carbon and silicon carbide, the sum of both ingredients should be more than about 40%, flux powder or particles are contained as auxiliary ingredients and ferro-alloy particles or metallic particles may be added to the present arc covering agent in order to freely adjust the hardness of the weld metal. Such mixed, fine particles are mixed, or covered by the addition of a binder of a proper concentration so that the electrically conductive power or particles may be mixed with non-conductive particles. The fine particles are then dried and coagulated and are used as of proper grain size. The sum of said auxiliary ingredients should be less than 60%. The carbon in the arc covering agent may be either The present invention is shown in detail in accompanying table 1 with reference to the examples.

In the examples in Table 1, single beads were automatically deposited on cast iron or steel base materials without preheating by using two kinds of welding rods, namely, silicon containing steel wires made purposely to contain less than 5% silicon and steel wires made purposely to contain no silicon, that is, ordinary steel wires for welding and, by using the arc covering agents of various mixing rates.

The examples in Table 1 are classified with respect to the beads to be obtained into three groups of (A) those low in hardness, (B) those medium in hardness and (C) those high in hardness. As seen from these examples, if the kind of the welding rod (steel wire), the mixing rate of the arc covering agent and the welding conditions are properly selected, it will be possible to freely obtain a cast iron weld metal of any desired hardness. For example, if welding is made, as in Example 1, by using a welding rod of a silicon-containing steel wire made purposely to contain silicon and an arc covering agent made to contain such a large amount of carbon and silicon carbide as about 70% in the sum of both or, as in Example 2, by using a welding rod of an ordinary steel wire for welding and an arc covering agent containing a large amount (about 60%) of carbon and silicon carbide and besides a proper amount of ferrosilicon, a weld metal with a low hardness and a structure of gray pig iron in which flake-graphite or chrysanthemum-flower-shaped graphite is well crystallized, will be obtained as the bead on a cast iron base material. Further, if welding is made, as in Example 3, by using an ordinary steel wire for welding and an arc covering agent containing a proper amount of ferromanganese, a weld metal with a medium hardness and a structure of gray pig iron in which fine eutectic graphite is crystallized will be obtained on a cast iron base material. Further, by using the steel wire and the arc covering agent of the same kind, a weld metal having nearly the same hardness has been obtained on a mild steel base metal as shown in the Examples No. 3 and No. 4 in Table 1. That is to say, when depositing cast iron on a cast iron base metal as shown in the Example No. 3 the mean hardness of the weld metal in Vicker's hardness was 523 while when depositing cast iron on a mild steel base metal as shown in the Example No. 4 the hardness was 522. The reason for this phenomena seems to be that in the Example No. 3 the martensite structure developed a little more than in the Example No. 4 but, in the latter a small amount of the ledeburite structure appeared. As the martensite and ledeburite are both the hard structural constituents, the Examples No. 3 and No. 4 showed nearly the same hardness. In case it is desired to obtain a cast iron weld metal of a higher hardness, if, as in Example 5, an ordinary steel wire for welding is used and an arc covering agent made to contain comparatively much ferromanganese is adopted, a weld metal of a very high hardness will be able to be obtained on a cast iron base material. If, as in Example 6, an arc covering agent containing a large amount of carbon and comparatively much ferromanganese is used, a weld metal with a structure of white pig iron and a very high hardness will be able to be deposited on a mild steel base material.

Figure 2:
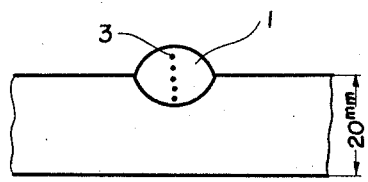
FIGURE 2 shows the Vicker's hardness measuring positions in the cross-section of the bead in FIGURE 1.

In the welding conditions of Examples 1 to 6 in the above mentioned Table 1, only the travelling speed was varied but, for the welding current and arc voltage which were other important conditions, 410 amperes and 32 volts were respectively made standards. The mean hardness of the weld metal in the same table is a mean value of the hardness obtained by measuring the various points shown in FIGURE 2 on the cut surface in FIGURE 1. In FIGURE 1, the numeral 1 represents a single bead and the numeral 2 represents the cut position for measuring the hardness. In FIGURE 2, the numeral 3 represents the position of the points where the hardness was measured.

The chemical compositions of the silicon-containing steel wire and the ordinary steel wire for welding which are welding rods used in the examples in Table 1 are as shown in the following Table 2.

*Table 1.—Examples of Single Bead Deposition*

| Hardness of the bead to be obtained | Kind of the base material | Example No. | Kind of the steel wire (4 mm. in diameter) | Mixing rates in the arc covering agent (The numbers in the parentheses are in percent by weight) | | | | | | |
|---|---|---|---|---|---|---|---|---|---|---|
| | | | | Carbon | Silicon carbide | Lime | Fluorite | Ferro-alloy | Sodium silicate | Total |
| A. Low hardness | Cast iron | 1 | Silicon-containing steel wire | 50 (42.3) | 30 (25.9) | 15 (13.0) | 5 (4.3) | Nil | 15.8 (13.6) | 115.8 (100) |
| | | 2 | Ordinary steel wire for welding | 50 (36.8) | 30 (22.1) | 15 (11.0) | 5 (3.7) | ¹ 20 (14.7) | 15.8 (11.6) | 135.8 (100) |
| B. Medium hardness | Cast iron | 3 | Ordinary steel wire for welding | 30 (26.8) | 30 (26.8) | 20 (17.8) | 10 (8.9) | ² 10 (8.9) | 12.1 (10.8) | 112.1 (100) |
| | Mild steel | 4 | Ordinary steel wire for welding | 30 (26.8) | 30 (26.8) | 20 (17.8) | 10 (8.9) | ² 10 (8.9) | 12.1 (10.8) | 112.1 (100) |
| C. High hardness | Cast iron | 5 | Ordinary steel wire for welding | 30 (24.6) | 30 (24.6) | 20 (16.4) | 10 (8.2) | ² 20 (16.4) | 12.1 (9.7) | 112.1 (100) |
| | Mild steel | 6 | Ordinary steel wire for welding | 50 (36.7) | 30 (22.0) | 15 (11.0) | 5 (3.7) | ² 20 (14.7) | 16.4 (12.0) | 136.4 (100) |

¹ Ferrosilicon.
² Ferromanganese.

Table I—Continued

| Hardness of the bead to be obtained | Kind of the base material | Example No. | Kind of the steel wire (4 mm. in diameter) | Welding condition — Travelling speed in cm./min. | Conditions of the bead* — Mean hardness of the weld metal in Vicker's hardness | Conditions of the bead* — Kind and structure of cast iron | Consumption of the steel wire (4 mm. in diameter) in cm./min. |
|---|---|---|---|---|---|---|---|
| A. Low hardness | Cast iron | 1 | Silicon containing steel wire | 21 | 290 | Gray pig iron: Flaky graphite and chrysanthemum flower-shaped graphite crystallized. There was fine eutectic graphite. Martensite was little. | 64 |
| A. Low hardness | Cast iron | 2 | Ordinary steel wire for welding | 21 | 322 | Gray pig iron: Chrysanthemum flower-shaped graphite crystallized. There were fine eutectic graphite and martensite. | 60 |
| B. Medium hardness | Cast iron | 3 | Ordinary steel wire for welding | 21 | 523 | Gray pig iron: Martensite was more than desired. There was fine eutectic graphite. | 56 |
| B. Medium hardness | Mild steel | 4 | Ordinary steel wire for welding | 21 | 522 | White pig iron (mottled pig iron): There was martensite. Fine eutectic graphite was little. A small amount of ledeburite existed. | 55 |
| C. High hardness | Cast iron | 5 | Ordinary steel wire for welding | 21 | 593 | Gray pig iron: Martensite was much. There was fine eutectic graphite. | 56 |
| C. High hardness | Mild steel | 6 | Ordinary steel wire for welding | 25 | 640 | White pig iron: It was a hypoeutectic alloy. Martensite and ledeburite were much. | 58 |

NOTE—*shows the state as welded. When the welding conditions are properly selected or when a proper heat-treatment is carried out before and after the welding, the microscopic structure of the bead will vary. Especially the martensite will decrease or disappear and the bead will soften. Thus, a bead of a hardness remarkable lower than in the case of Example 1 or 2 will be obtained.

*Table 2.—Chemical Compositions of Steel Wires Used*

| Kind of welding rods | Chemical composition in percent | | | | | |
|---|---|---|---|---|---|---|
| | C | Si | Mn | P | S | Cu |
| Silicon-containing steel wire | 0.06 | 2.76 | 0.48 | 0.009 | 0.005 | — |
| Ordinary steel wire for welding | 0.13 | 0.015 | 0.32 | 0.011 | 0.015 | 0.10 |

NOTE.—In the above table, — represents that no analysis was made.

The chemical compositions of the cast iron and steel which are material to be welded in the Table 1 are as shown in the following Table 3.

*Table 3.—Chemical Compositions of Base Materials Used*

| Kind of base materials | Chemical compositions in percent | | | | | |
|---|---|---|---|---|---|---|
| | C | Si | Mn | P | S | Cu |
| Cast iron | 3.30 | 1.85 | 0.69 | — | — | — |
| Mild steel | 0.14 | 0.05 | 0.94 | 0.008 | 0.01 | 0.14 |

NOTE.—In the above table, — represents that no analysis was made.

As described above, in the present invention, as shown by the amounts of consumption of steel wires per minute in the case of a welding current of 410 amperes and an arc voltage of 32 volts in the examples in Table 1, these values are substantially 3 times as high as or higher than the amounts of consumption of steel core wires in the case of welding or depositing under proper welding conditions by using coated arc welding rods having core wires of the same diameter. It can be thereby understood that, in the method of the present invention, the welding or depositing operation can be carried out at a very high efficiency.

It is shown from the examples in Table 1 that the method of the present invention has such a very great industrial effect that a cast iron weld metal of a hardness freely selected in a wide range can be easily obtained by using an ordinary steel wire for welding or a silicon-containing steel wire without using any special cast iron welding rod.

The welding according to the present invention may be carried out either by an automatic apparatus or by a semi-automatic apparatus. It may be carried out also by a manual method needing a high degree of skill.

What we claim is:

1. A method of arc welding cast iron on a ferrous metal base, comprising the steps of establishing an arc between a ferrous metal base and the tip of a bare steel wire adapted to be fed toward the base during the welding, and covering the arc with an arc covering agent of a mixture of fine particles consisting essentially of carbon and silicon carbide, a flux selected from the group consisting of lime and fluorite, and a binder selected from the group consisting of sodium silicate and potassium silicate, the carbon and silicon carbide being present in the mixture in an amount of from 40 to 70% by weight of the total amount of the mixture, and said mixture being dry and coagulated.

2. A method as claimed in claim 1 in which the ferrous metal base is cast iron.

3. A method as claimed in claim 1 in which the ferrous metal base is steel.

4. A method of arc welding cast iron on a ferrous metal base, comprising the steps of establishing an arc between a ferrous metal base and the tip of a bare steel wire adapted to be fed toward the base during the welding, and covering the arc with an arc covering agent of a mixture of fine particles consisting essentially of carbon and silicon carbide, a flux selected from the group consisting of lime and fluorite, and a binder selected from the group consisting of sodium silicate and potassium silicate, said mixture further having therein a hardness adjusting agent in the form of particles of a ferro-alloy, the carbon and silicon carbide being present in the mixture in an amount of from 40 to 70% by weight of the total amount of the mixture, said mixture being dry and coagulated.

5. An arc covering agent for use in arc welding cast iron on a ferrous metal base, said agent being a mixture of fine particles consisting essentially of carbon and silicon carbide, a flux selected from the group consisting of sodium silicate and potassium silicate, the carbon and silicon carbide being present in the mixture in an amount up to 70% by weight of the mixture with carbon being present in an amount greater than 24.6% by weight and silicon carbide being present in an amount greater than 22% by weight, said mixture being dry and coagulated.

References Cited in the file of this patent

UNITED STATES PATENTS

| | | |
|---|---|---|
| 2,043,960 | Jones et al. | June 9, 1936 |
| 2,323,711 | Franklin | July 6, 1943 |
| 2,900,490 | Petryck et al. | Aug. 18, 1959 |

FOREIGN PATENTS

| | | |
|---|---|---|
| 797,498 | Great Britain | July 2, 1958 |